(12) United States Patent
Henry et al.

(10) Patent No.: US 11,989,871 B2
(45) Date of Patent: May 21, 2024

(54) MODEL TRAINING APPARATUS AND METHOD

(71) Applicant: CANON MEDICAL SYSTEMS CORPORATION, Otawara (JP)

(72) Inventors: Joseph Henry, Edinburgh (GB); Aneta Lisowska, Edinburgh (GB)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 534 days.

(21) Appl. No.: 17/336,968

(22) Filed: Jun. 2, 2021

(65) Prior Publication Data

US 2022/0392048 A1  Dec. 8, 2022

(51) Int. Cl.
*G06T 7/00* (2017.01)
*G06N 3/045* (2023.01)
*G06N 3/08* (2023.01)
*G06T 7/11* (2017.01)

(52) U.S. Cl.
CPC .......... *G06T 7/0004* (2013.01); *G06N 3/045* (2023.01); *G06N 3/08* (2013.01); *G06T 7/11* (2017.01); *G06T 2207/20081* (2013.01); *G06T 2207/20084* (2013.01); *G06T 2207/30016* (2013.01)

(58) Field of Classification Search
CPC . G06T 2207/20081; G06T 2207/20084; G06T 7/0012; G06T 7/11; G06T 2207/10016; G06T 2207/10024; G06T 7/73; G06T 5/73; G06T 7/70; G06T 17/00; G06T 2207/30096; G06T 17/20; G06T 3/4053; G06T 5/50; G06T 2207/30024; G06T 3/40; G06T 5/20; G06T 7/0004; G06T 11/60; G06T 19/20; G06T 2207/10028; G06T 2207/20104; G06T 2207/30004; G06T 2210/16;
(Continued)

(56) References Cited

U.S. PATENT DOCUMENTS 7,499,250 B2 * 3/2009 Zhang ................. H02H 1/0015
  361/42
2006/0229856 A1 * 10/2006 Burrus ................ G16H 30/40
  703/11
(Continued)

OTHER PUBLICATIONS

Shmelkov et al., "Incremental Learning of Object Detectors Without Catastrophic Forgetting", Proceedings of the IEEE International Conference on Computer Vision, 2017, 10 pages.
(Continued)

*Primary Examiner* — Ajibola A Akinyemi
(74) *Attorney, Agent, or Firm* — Oblon, McClelland, Maier & Neustadt, L.L.P.

(57) ABSTRACT

An apparatus comprises processing circuitry configured to receive a first model and a second model; determine difference information that is representative of a difference between the first model and the second model and/or between the first task and the second task and/or between the first domain and the second domain; and generate a third model using the first model, the second model and the difference information, wherein the generating of the third model comprises training the third model to perform both of the first task and the second task and/or to operate on both the first domain and the second domain.

20 Claims, 9 Drawing Sheets

(58) Field of Classification Search
CPC ....... G06T 2210/36; G06T 7/246; G06T 7/90; G06T 11/00; G06T 2207/20132
USPC ........................................................ 382/156
See application file for complete search history.

(56) References Cited

U.S. PATENT DOCUMENTS

| | | | |
|---|---|---|---|
| 2007/0116347 A1* | 5/2007 | Hong | G06T 7/143 |
| | | | 382/173 |
| 2007/0265813 A1* | 11/2007 | Unal | G06T 7/12 |
| | | | 703/2 |
| 2019/0362522 A1 | 11/2019 | Han | |
| 2020/0050943 A1 | 2/2020 | Ishii et al. | |
| 2020/0125930 A1 | 4/2020 | Martin et al. | |

OTHER PUBLICATIONS

Lee et al., "Overcoming Catastrophic Forgetting With Unlabeled Data in the Wild", Proceedings of the IEEE/CVF International Conference on Computer Vision (ICCV), 2019, 14 pages.
Kirkpatrick et al., "Overcoming Catastrophic Forgetting in Neural Networks", https://arxiv.org/pdf/1612.00796, 2017, 13 pages.
Li et al., "Learning Without Forgetting", https://arxiv.org/abs/1606.09282, 2017, 13 pages.
Li et al., "Continual Learning of New Diseases With Dual Distillation and Ensemble Strategy", In: Martel A.L. et al. (eds) Medical Image Computing and Computer Assisted Intervention—MICCAI 2020, Lecture Notes in Computer Science, vol. 12261. Springer, Cham. https://doi.org/10.1007/978-3-030-59710-8_17, 2020, 10 pages.

* cited by examiner

MODEL TRAINING APPARATUS AND METHOD

FIELD

Embodiments described herein relate generally to a model training apparatus and method, for example an apparatus for training a model for continual learning of different tasks and/or domains.

BACKGROUND

It is known to train a neural network or other machine learning model sequentially on a plurality of different tasks. Such sequential learning may be considered to be a type of continual learning.

In some circumstances, a model needs to sequentially learn a series of tasks, but the model is not allowed to store raw data. For example, the model may be trained on medical data to which access is limited.

In one continual learning scenario, a model is trained using incremental class learning. Incremental class learning protocols comprise protocols in which a model sequentially learns to recognize new classes from a data distribution that remains similar to an original data distribution.

Since task identity is always provided, it is possible to train models with task-specific components. A typical neural network architecture used in this scenario has a multihead output layer, meaning that each task has its own output units but the rest of the network may be shared between tasks.

In one example of incremental class learning, a model is trained to perform a plurality of classification tasks, each comprising a respective segmentation. The model sequentially learns to recognize new classes.

A first task of the plurality of classification tasks comprises a calcium segmentation. A second task comprises a nodule detection. When the model is trained to perform the nodule detection task, it is also required to remember the calcium segmentation task. A third task comprises a lung segmentation. When the model is trained to perform the lung segmentation task, the model is required to remember the calcium segmentation task and the nodule detection task. A fourth task comprises a landmark detection. When the model is trained to perform the landmark detection task, the model is required to remember the calcium segmentation task, the nodule detection task and the lung segmentation task.

The model needs to be able both to solve each task seen so far, and to infer which task it is presented with.

Another type of continual learning is incremental domain learning. Incremental domain learning protocols may comprise protocols in which the structure of the tasks to be performed is always the same, but the input distribution is changing. For example, an input distribution may change when a different scanner is used, or when a task is performed on a different population. For domain incremental learning, the subsequent domains may be different but related to a first domain, for example the same anatomy but a different source.

A model is trained to perform a task on a first input distribution, then subsequently the model is trained to perform the task on a further, different input distribution. A model trained on different input distributions may be referred to as being trained on different domains.

Typically, the task identity is not available at test time. The model only needs to be able to solve the task at hand and is not required to infer which task it is.

FIG. 1 illustrates an example of training on different input distributions. A model is trained to perform stroke detection using a set of training data comprising images 12 obtained in a first institution which is in Glasgow. The images 12 obtained in the Glasgow institution have a first input distribution, which is illustrated in FIG. 2 as a histogram 11. The histogram may represent, for example, measured intensity values across all of the images 12 obtained in the Glasgow institution. In an example, the measured intensity values may be CT values in Hounsfield units.

The model is later trained to perform stroke detection using a set of training data comprising images 14 obtained in a second institution which is in Japan. The training data obtained in the Japanese institution has a different input distribution from the training data obtained in the Glasgow institution. The different input distribution is shown in FIG. 2 as a histogram 13. Histogram 13 may represent, for example, measured intensity values across all of the images 14 obtained in the Japanese institution.

The model is further trained to perform stroke detection using a set of training data comprising images 16 obtained in a third institution which in the USA. The training data obtained in the USA institution has a different input distribution from the training data obtained in Glasgow and from the training data obtained in Japan. The different input distribution is shown in FIG. 2 as histogram 15. Histogram 15 may represent, for example, measured intensity values across all of the images 16 obtained in the USA institution. Histogram 15 differs from histogram 13 representing the input distribution of the training data from Japan, and differs from histogram 11 representing the input distribution of the training data from Glasgow.

It has been found that a neural network model trained sequentially on different tasks or on different domains may experience a reduction in performance on a first task or domain when the model is later trained on a second, different task or domain. They model may suffer from catastrophic forgetting. Catastrophic forgetting may comprise the model forgetting how to perform a first task when it is later trained to perform a second, different task. Catastrophic forgetting may comprise the model forgetting how to perform a task in a first domain (for example, on a first input distribution) when it is later trained on data from a second domain (for example, on a second input distribution).

FIG. 2 illustrates an example of catastrophic forgetting. FIG. 2 plots Dice score against task, where Dice score is a measure of similarity and measures how well the results of a model match ground truth results. Dice score is used as a metric for model performance.

Tasks are incrementally added to the model in a continual incremental class learning setup. In the example shown in FIG. 2, a global distillation continual learning approach is used. Global distillation differs from previous distillation methods in that previous distillation methods used knowledge from trained models in a task-wise manner instead of a global manner, and so could not discriminate between classes in different tasks.

In a first training period, shown as 1 on the horizontal axis of FIG. 2, the model is trained to segment the left lung. A Dice score is used as a measure of segmentation performance. After the first training period, the model achieves a Dice score of 0.924 for segmenting the left lung.

In a second training period, shown as 2 on the horizontal axis of FIG. 2, the same model is trained to segment the right lung. After the second training period, the model achieves a Dice score of 0.933 for segmenting the left lung, and a Dice score of 0.892 for segmenting the right lung.

In a third training period, shown as 3 on the horizontal axis of FIG. 2, the same model is trained to segment the spinal cord. After the third training period, the model achieves a Dice score of 0.932 for segmenting the left lung; a Dice score of 0.889 for segmenting the right lung; and a Dice score of 0.835 for segmenting the spinal cord.

In a fourth training period, shown as 4 on the horizontal axis of FIG. 2, the same model is trained to segment the trachea. After the fourth training period, the model achieves a Dice score of 0.932 for segmenting the left lung; a Dice score of 0.896 for segmenting the right lung; a Dice score of 0.835 for segmenting the spinal cord; and a Dice score of 0.863 for segmenting the trachea.

A fifth training period, shown as 5 on the horizontal axis of FIG. 2, the same model is trained to segment the oesophagus. After the fifth training period, the model achieves a Dice score of 0.932 for segmenting the left lung; a Dice score of 0.892 for segmenting the right lung; a Dice score of 0.827 for segmenting the spinal cord; a Dice score of 0.841 for segmenting the trachea; and a Dice score of 0.463 for segmenting the oesophagus.

It is hypothesized that when training on the left lung followed by the right lung, for example, the new class has some overlapping features with the previous class. When learning to segment the oesophagus there may be a large shift in the representation that the model needs to learn in order to perform the new segmentation task.

In a sixth training period, shown as 6 on the horizontal axis of FIG. 2, the model is trained to segment ground glass, which is a pathology class. After the sixth training period, the model achieves a Dice score of 0.912 for segmenting the left lung; a Dice score of 0.87 for segmenting the right lung; and a Dice score of 0.791 for segmenting the trachea. The model achieves a Dice score of 0.8 for segmenting the new ground glass class. However, the Dice score decreases to zero for both the oesophagus segmentation task and the spinal cord segmentation task. The model has forgotten how to segment the oesophagus and the spinal cord.

The decrease to zero is highlighted in FIG. 2 by a ring 10.

In a seventh training period, shown as 7 on the horizontal axis of FIG. 2, the model is trained to segment consolidation, which refers to fluid in the lungs. After the seventh training period, the model achieves a Dice score of 0.907 for segmenting the left lung; a Dice score of 0.856 for segmenting the right lung; a Dice score of 0.758 for segmenting the trachea; and a Dice score of 0.776 for segmenting ground glass. The model achieves a Dice score of 0.293 for segmenting consolidation. The model continues to achieve a Dice score of 0 for segmenting spinal cord and for segmenting oesophagus.

It may be seen in FIG. 2 that the global distillation continual learning approach worked well until task 6 was added, which is the ground glass class. It may be considered that the ground glass class, as a pathology class, is very different than previous anatomy classes. This may be hypothesized to cause catastrophic forgetting of the spinal cord and oesophagus classes.

Some continual learning approaches may alleviate the effects of catastrophic forgetting. However, a degree of similarity between tasks or domains and a relative difficulty of the trained tasks may affect model performance as more classes are learned. Known continual learning approaches may not be robust to learning a new class that has overlapping features with a previously learned class. Known continual learning approaches may not be robust to learning a new domain if the distribution of the data in the new domain is very different to previous domains.

BRIEF DESCRIPTION OF THE DRAWINGS

Embodiments are now described, by way of non-limiting example, and are illustrated in the following figures, in which.

DETAILED DESCRIPTION

Certain embodiments provide an apparatus comprising processing circuitry configured to: receive a first model and a second model, wherein: the first model is trained to perform a first task; the first model is trained on first training data of a first domain; the second model is trained on second, different training data; and at least one of a) and b):—
a) the second model is trained to perform a second task that is different from the first task;
b) the second training data is data of a second domain that is different from the first domain;
determine difference information that is representative of a difference between the first model and the second model and/or between the first task and the second task and/or between the first domain and the second domain; and generate a third model using the first model, the second model and the difference information, wherein the generating of the third model comprises training the third model to perform both of the first task and the second task and/or to operate on both the first domain and the second domain.

Certain embodiments provide a method comprising: receiving a first model and a second model, wherein: the first model is trained to perform a first task; the first model is trained on first training data of a first domain; the second model is trained on second, different training data; and at least one of a) and b):— a) the second model is trained to perform a second task that is different from the first task;

b) the second training data is data of a second domain that is different from the first domain;

determining difference information that is representative of a difference between the first model and the second model and/or between the first task and the second task and/or between the first domain and the second domain; and generating a third model using the first model, the second model and the difference information, wherein the generating of the third model comprises training the third model to perform both of the first task and the second task and/or to operate on both the first domain and the second domain.

Figure 1:
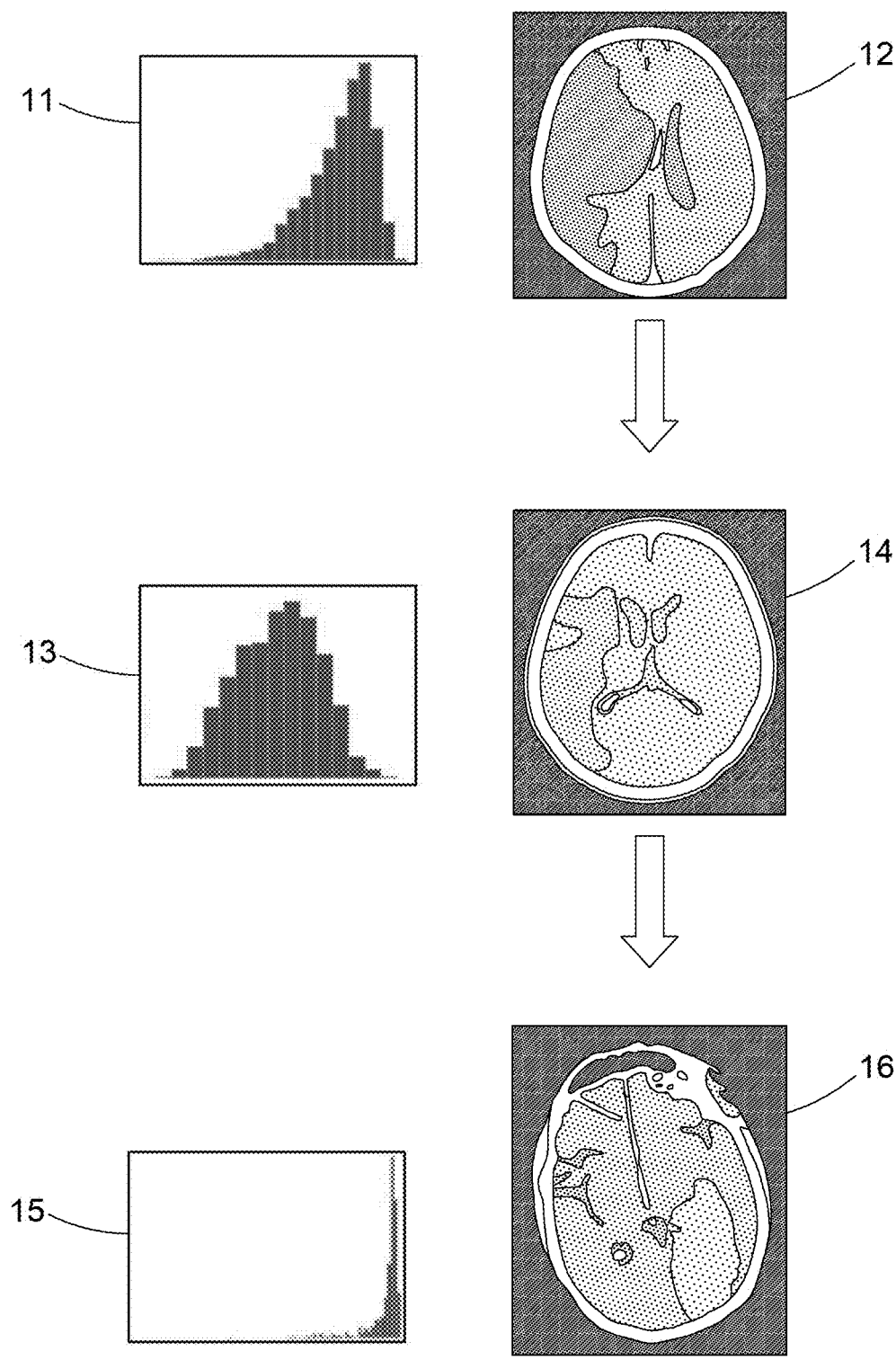
FIG. 1 is a schematic illustration of different input distributions.
Figure 2:
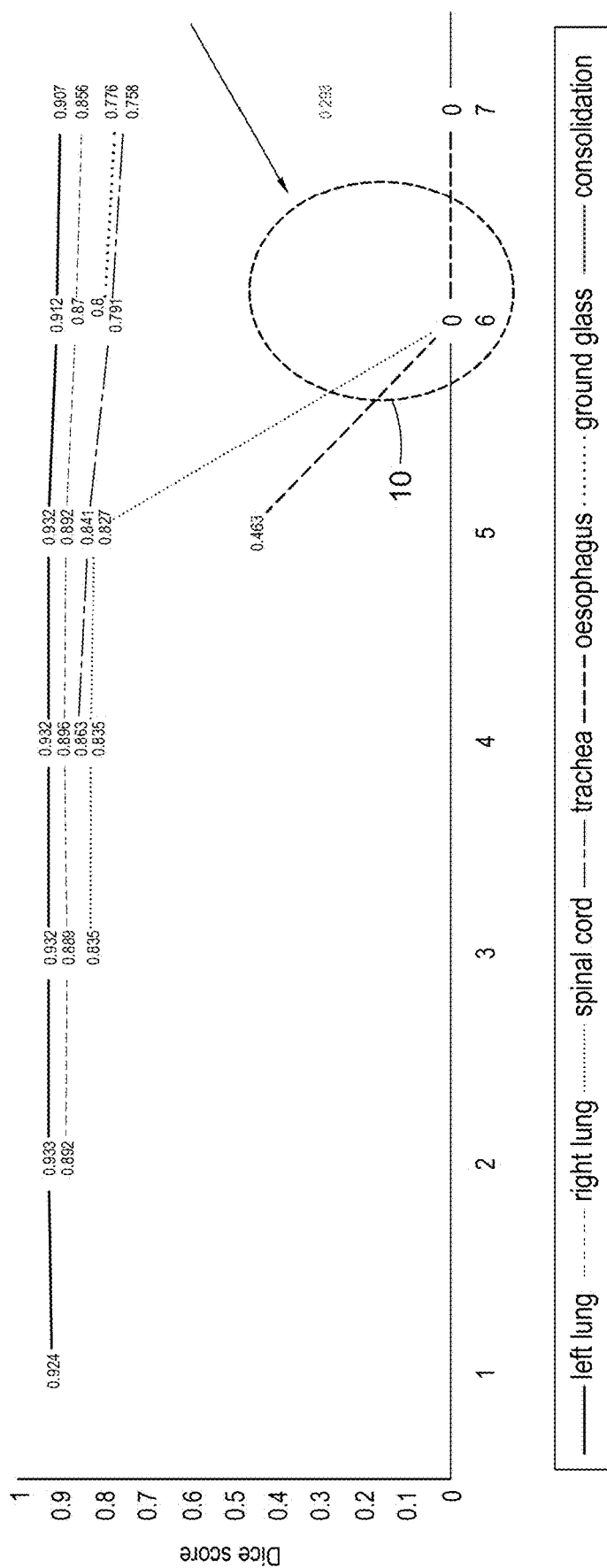
FIG. 2 is a plot of performance of a global distillation continual learning model.
Figure 3:
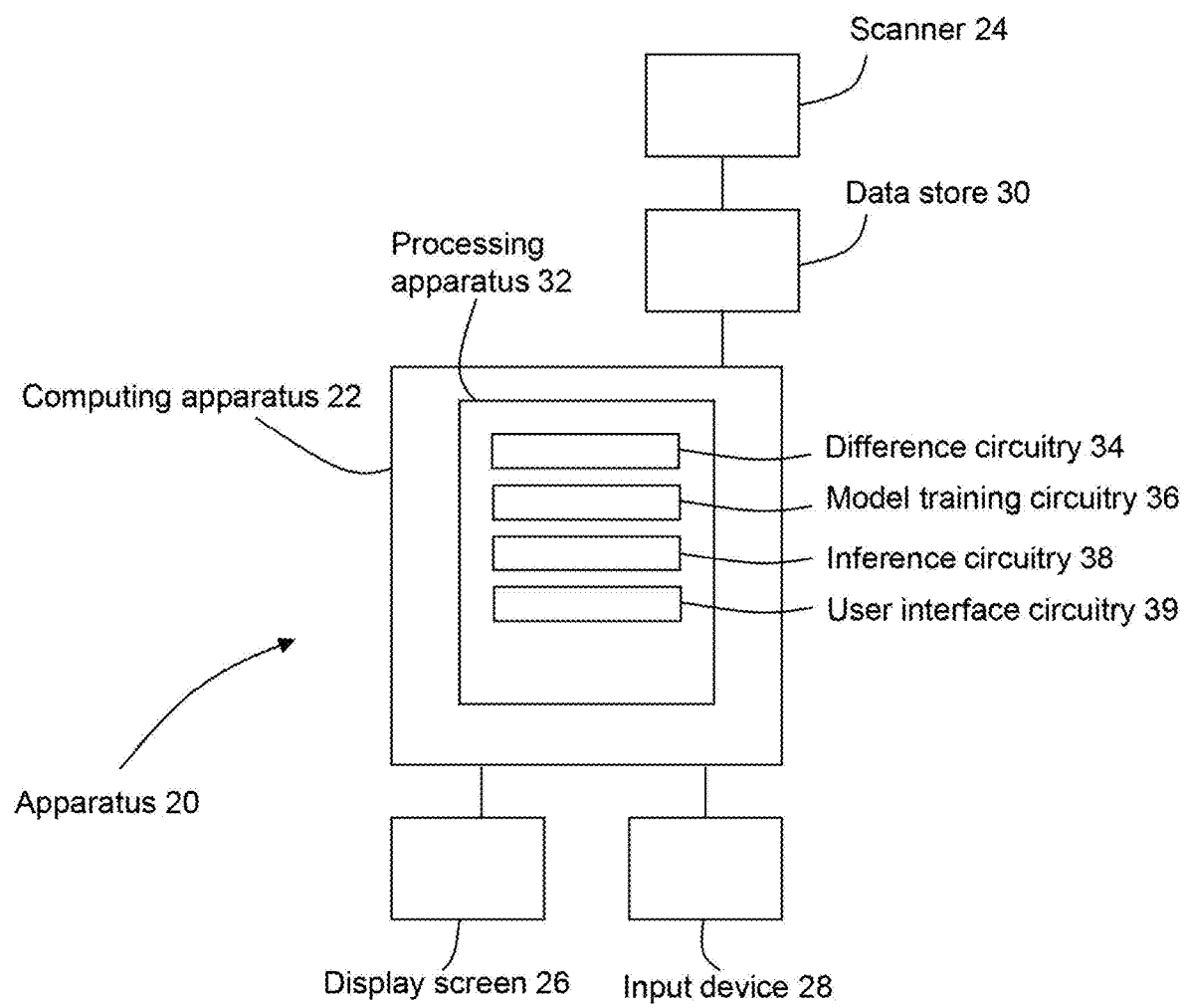
FIG. 3 is a schematic diagram of an apparatus in accordance with an embodiment.

An apparatus 20 according to an embodiment is illustrated schematically in FIG. 3. The apparatus is configured to obtain a first trained model and a second trained model, and to train a third model using the first trained model and second trained model. In the present embodiment, the apparatus is also configured to apply the third model once it is trained. In other embodiments, the third model may be trained by a first apparatus and used by a second, different apparatus.

The apparatus 20 comprises a computing apparatus 22, in this case a personal computer (PC) or workstation. The apparatus 20 is connected to at least one scanner 24 via a data store 30. The apparatus 20 is also connected to one or more display screens 26 and an input device or devices 28, such as a computer keyboard, mouse or trackball.

The at least one scanner 24 may comprise any scanner that is configured to perform medical imaging. The or each scanner 24 is configured to generate medical image data, which may comprise two-, three- or four-dimensional data in any imaging modality. For example, the scanner 24 may comprise a magnetic resonance (MR or MRI) scanner, CT (computed tomography) scanner, cone-beam CT scanner, X-ray scanner, ultrasound scanner, PET (positron emission tomography) scanner or SPECT (single photon emission computed tomography) scanner.

Image data sets obtained by the at least one scanner 24 are stored in the data store 30 and subsequently provided to computing apparatus 22.

In other embodiments, the apparatus 20 and data store 30 are not connected to any scanner 24.

In the present embodiment, the data store 30 stores a plurality of training image data sets and associated ground truth data. The ground truth data may have been obtained by manual annotation of the training image data set by an expert, or by any suitable automated or semi-automated method. The data store 30 also stores at least one un-annotated image data set.

The training image data sets may not all be available at the same time. Access to training image data sets may be restricted.

In an alternative embodiment, training image data sets and/or other image data sets are supplied from one or more further data stores (not shown), which may form part of a Picture Archiving and Communication System (PACS). The data store 30 or further data store may comprise any suitable form of memory storage.

In further embodiments, the training data sets and/or the data sets to which the trained models are to be applied may not comprise image data sets. For example, the data sets may comprise clinical data such as vital sign data, laboratory data, or text data.

Computing apparatus 22 comprises a processing apparatus 32 for processing of data, including image data. The processing apparatus comprises a central processing unit (CPU) and Graphical Processing Unit (GPU). In other embodiments, the processing apparatus may comprise a CPU without a GPU.

The processing apparatus 32 includes difference circuitry 34 configured to obtain a difference between models, tasks and/or domains; model training circuitry 36 configured to train a third model based on first and second trained models; and inference circuitry 38 configured to apply the trained models to unseen data to obtain model outputs. The processing apparatus 32 may further comprise user interface circuitry 39 configured to receive inputs via a user interface and/or to display outputs via the user interface.

In the present embodiment, the circuitries 34, 36, 38, 39 are each implemented in the CPU and/or GPU by means of a computer program having computer-readable instructions that are executable to perform the method of the embodiment. In other embodiments, the various circuitries may be implemented as one or more ASICs (application specific integrated circuits) or FPGAs (field programmable gate arrays).

The computing apparatus 22 also includes a hard drive and other components of a PC including RAM, ROM, a data bus, an operating system including various device drivers, and hardware devices including a graphics card. Such components are not shown in FIG. 3 for clarity.

Figure 4A:
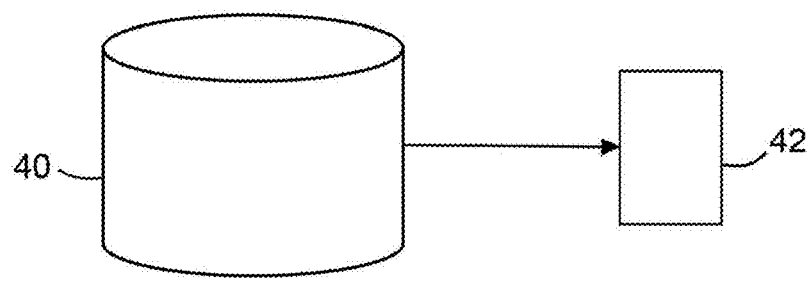
FIG. 4a is a schematic illustration of training of a first model.
Figure 4B:
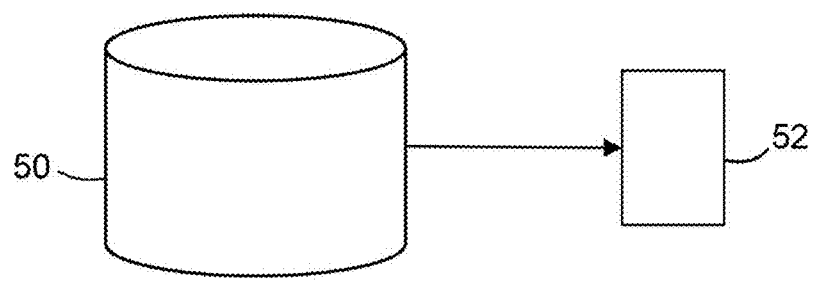
FIG. 4b is a schematic illustration of training of a second model.
Figure 4C:
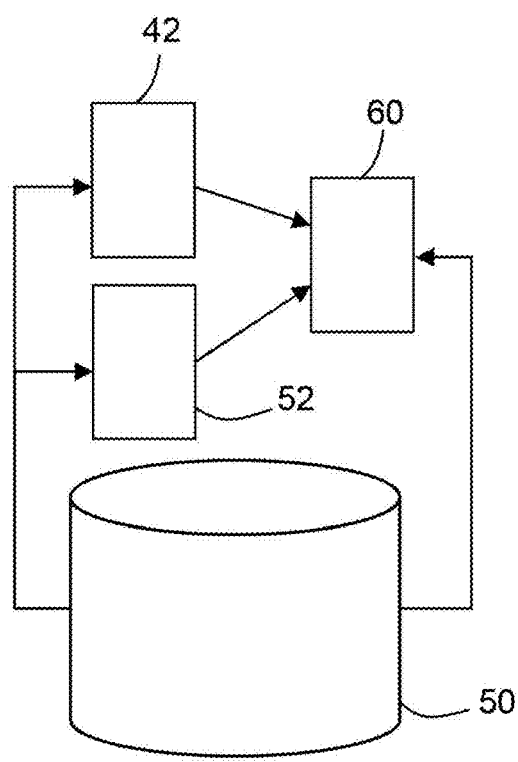
FIG. 4c is a schematic illustration of training of a third model in accordance with an embodiment.

The apparatus of FIG. 3 is configured to perform a method illustrated in overview in FIGS. 4a to 4c.

FIG. 4a represents the training of a first model 42 using a first set of training data 40 comprising a first plurality of training image data sets. The first set of training data relates to a first task, and comprises training image data sets that are labelled with ground truth data relating to the first task.

In the present embodiment, the model training circuitry 36 is configured to perform the training of the first model 42 based on the first set of training data 40. In other embodiments, the first model 42 is trained by another, different apparatus and is received by the model training circuitry 36 as a trained model. In such embodiments, the model training circuitry 36 may not have any access to the first set of training data 40. In other embodiments, the model training circuitry 36 may have access to the first set of training data 40 that is time-limited.

FIG. 4b represents the training of a second model 52 using a second set of training data 50 comprising a second plurality of training image data sets. In the present embodiment, the first trained model 42 is used as a starting point for the training of the second model 52. The second model 52 is trained to perform a second task that is different from the first task for which the first model 42 is trained. The second set of training data relates to the second task, and comprises training image data sets that are labelled with ground truth data relating to the second task.

The first model 42 is only trained to perform the first task, and is not trained to perform the second task. The second model is not explicitly trained to perform the first task. Because the first trained model 42 is used as a starting point for training the second model 52, the second model 52 is capable of performing the first task and the second task.

In other embodiments, each of the first model 42 and the second model 52 is trained from the same starting point, for example from the same pretrained model. The first model 42 is only trained to perform the first task, and is not trained to perform the second task. The second model 52 is only trained to perform the second task, and is not trained to perform the first task.

In further embodiments, both the first model and the second model are trained to perform the first task, but the second model trained on a different domain from the first model, for example using a different input distribution. The first model is trained on a first set of training data which relates to the first task and comprises training image data sets that are labelled with ground truth data relating to the first task. The second model is trained on a second set of training data which relates to the first task relates to the first task, and comprises training image data sets that are labelled with ground truth data relating to the first task. However, the second set of training data relates to a different domain from the first set of training data. For example, the second set of training data may have been obtained from a different scanner from the scanner from which the first set of training data was obtained. The second set of training data may be representative of a different population than the first set of training data.

In further embodiments, the second model may be trained on both a different task and a different domain than the first model.

In the present embodiment, the model training circuitry 36 is configured to perform the training of the second model 52 based on the second set of training data 50. In other embodiments, the second model 52 is trained by another, different apparatus and is received by the model training circuitry 36 as a trained model. The model training circuitry 36 has access to the second set of training data 50.

FIG. 4c is representative of the training of a third model 60 by the model training circuitry 36. The third model 60 is a distil model. A distil model may be a model that is trained to perform the same task as an initial model or models on which it is trained. The distil model may also be referred to as a distillation model or as a student model. Usually, the distil model is smaller and/or less complex than the initial model or models. A distil model may be trained using a distillation loss, where the distillation loss uses a comparison between outputs of the initial model and outputs of the distil model to train the distil model to produce outputs that are more like those of the initial model.

In the present embodiment, the distil model 60 is trained to perform the first task and the second task. In other embodiments, the distil model 60 is trained to perform the first task on a first domain and on a second, different domain.

In the present embodiment, the first model 42, second model 52 and third model 60 are all neural network models. In other embodiments, any suitable type of model may be used. The first model 42, second model 52 and third model 60 may be any type of model that learns features from data as part of model training in a supervised manner. For example, supervised dictionary learning may be used.

The model training circuitry 37 trains the distil model 60 on the second set of training data 50 and on predictions from the first trained model 42 and second trained model 52. The predictions from the first trained model 42 and second trained model 52 may be considered to encapsulate information about both the first set of training data 40 and the second set of training data 50.

In the present embodiment, the model training circuitry 36 only has access to the second set of training data 50 when training the distil model 60. It is known that the access only to the second set of training data 50 has the potential to bias the training of the distil model 60 to the second task. If it were the case that the first model and second model were trained to perform the same task on different domains, access only to the second set of training data 50 may have the potential to bias the task to the second domain.

Therefore, the model training circuitry 36 trains the distil model 60 using a regularization term that is selected to stop the distil model 60 from being too heavily biased towards the second task (or the second domain). The regularization term applies a loss on the features extracted by the model.

By using the regularization term, the model training circuitry 36 applies a regularization scheme to the training of the distil model 60. The regularization scheme incorporates a difference between the first and second tasks (or between the first and second domains). A determining and use of the difference between first and second tasks (or domains) is described further below.

The use of such a regularization scheme may result in improved preservation of performance on previously learned tasks or domains when compared to training without the regularization scheme. The use of the regularization scheme may result in keeping a similar level of performance on new tasks or domains when compared to training without the regularization scheme.

For example, the distil model 60 may keep a similar performance to the first model 42 on the first task and a similar performance to the second model 52 on the second task, despite being trained only on the second set of training data 50 and not on the first set of training data 40.

In the present embodiment, the model training circuitry 36 does not have access to the first set of training data 40 when training the distil model 60. In other embodiments, the model training circuitry 36 may have access to some or all of the first set of training data 40 when training the distil model 60.

Figure 5:
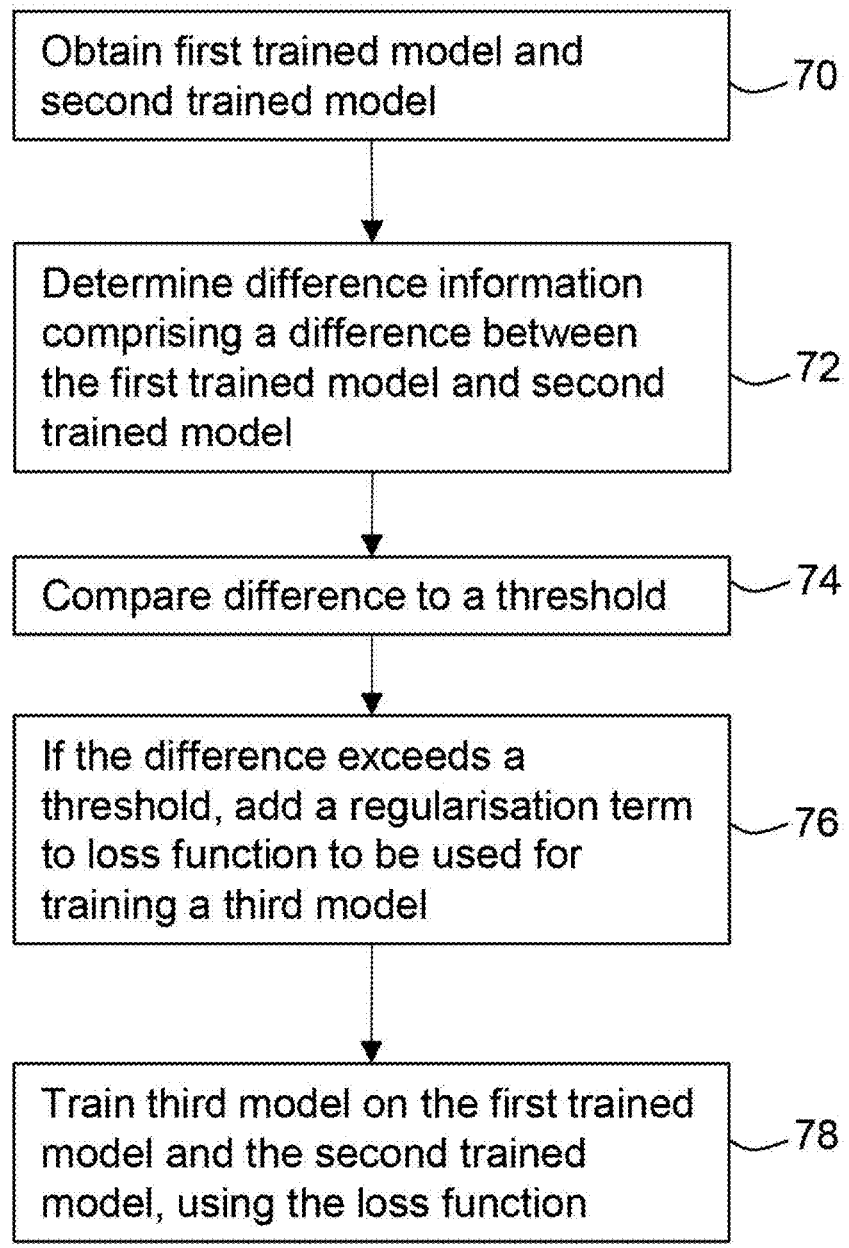
FIG. 5 is a flow chart illustrating in overview a method in accordance with an embodiment.

FIG. 5 is a flow chart illustrating in overview a method of an embodiment, which may be the same embodiment as described above with reference to FIG. 4c.

At stage 70, the apparatus 30 obtains a first trained model 42 and a second trained model 52, which are trained as described above with reference to FIGS. 4a and 4b.

At stage 72, the difference circuitry 34 determines difference information for the first trained model 42 and second trained model 52. The difference information is representative of a degree of similarity or difference between the first trained model 42 and the second trained model 52.

The difference information comprises at least one measure of difference. It is noted that a measure of difference may also be considered to be a measure of similarity, and vice versa.

In the present embodiment, the difference information is obtained by comparing the first trained model 42 and the second trained model 52. In other embodiments, the difference information is obtained by comparing information about a first task on which the first trained model 42 is trained and a second task on which the second trained model 52 is trained. It may be expected that a significant difference in tasks on which the models are trained may result in a difference in models. In further embodiments, the difference information is obtained by comparing information about the first domain in which the first trained model 42 is trained and a second domain in which the second trained model 52 is trained. It may be expected that a significant difference in domains on which the models are trained may result in a difference in models.

In the present embodiment, the first trained model 42 and second trained model 52 is a neural network that is constructed to have two parts. A first part of the network, which may be referred to as the body of the network, is constructed to perform extraction of features from data. The first part comprises a first plurality of network layers. A second part of the network, which may be referred to as the head of the network is constructed to combine the extracted features in order to obtain a final output. The second part comprises a second plurality of network layers. In other embodiments, feature extraction may be performed through any suitable supervised learning, for example through supervised learning, and features may then be combined.

In the present embodiment, the measure of difference that is calculated by the difference circuitry 34 is a difference between feature extractor parameters of the first trained model 42 and feature extractor parameters of the second trained model 52. The feature extractor parameters comprise a subset of all model parameters. The feature extractor parameters comprise model parameters relating to the first part of the network which performs feature extraction. In the present embodiment, the determined difference is an L1 distance between the feature extractor parameters.

If $\theta$ is all model parameters and $\varphi \subset \theta$ is the parameters for the feature extractor, for two models A and B:

$$d = \Sigma_{i=0}^{N} D(\varphi_{A_i}, \varphi_{B_i}) \quad \text{(Equation 1)}$$

Where $D(x, y)$ is the distance function and $N = \|\varphi\|$ $$\text{For } L1 \text{ distance, } D(x,y) = |\varphi_{A_i} - \varphi_{B_i}| \quad \text{(Equation 2)}$$

In other embodiments, any suitable method may be used to calculate a distance between models which is used as a measure of difference.

In some embodiments, the measure of difference that is calculated by the difference circuitry 34 is a difference in a distribution of task intensities. For example, a first model may be configured to perform a first task comprising a segmentation of pixels or voxels having a first set of intensity values, for example Hounsfield values. A second model may be configured to perform a second task comprising a segmentation of pixels or voxels having a second set of intensity values. If the first set of intensity values and the second set of intensity values are similar, the tasks may be considered to have similar task intensities. The first model and second model may therefore be considered to have similar task intensities.

In an incremental class learning scenario, in which the first task and second task different, a large overlap between task intensities is considered to require regularization. In an incremental domain learning scenario, in which the first domain and second domain are different, a large overlap between task intensities is considered not to require regularization.

In further embodiments, the measure of difference that is calculated by the difference circuitry 34 comprises a learned distance metric. For example, the learned distance metric may be calculated using a Siamese net or triplet net with contrastive loss. The Siamese net and triplet net are neural network approaches to learn embeddings of input data so as to minimize a difference between two samples of data in the same category and maximize a difference between data in different categories. In some embodiments, a Siamese net or triplet net is trained to produce an embedding that separates data from different populations of patients. Given data from two different populations, the Siamese net or triplet net is expected to produce outputs that are very different from each other, thus showing a large distance between these data. This large distance may indicate be used to indicate that regularization is required.

In further embodiments, the measure of difference may be provided by a user. In such embodiments, the user provides a user input using an input device 28 of the apparatus 30. The user interface circuitry 39 processes the user input to obtain a measure of difference. One such embodiment is described below with reference to FIG. 8.

At stage 74, the difference circuitry 34 compares the determined measure of difference to a threshold value. In the present embodiment, if the measure of difference is greater than a threshold value, the difference circuitry 34 determines that there is a large difference between the first model and the second model. If the measure of difference is not greater than the threshold value, the difference circuitry determines that there is not a large difference between the first model and the second model.

At stage 76, the model training circuitry 36 determines a loss function for training a third model 60.

In the present embodiment, if the measure of difference was determined to be greater than the threshold value at stage 74, the loss function includes a regularization term. If the measure of difference was not determined to be greater than the threshold value at stage 74, the loss function does not include a regularization term. It is considered that the models are similar enough that the regularization term is not needed.

In other embodiments, a regularization term may be included in all cases. In further embodiments, a regularization term may be used if there is a small measure of difference. For example, in an embodiment in which the measure of difference is a difference between task intensities, a regularization term may be used if there is a small difference between task intensities for a first task and task intensities for a second, different task.

The regularization term in the loss function is intended to force outputs of a feature extractor of the third model 60, which is a distil model, to be as close to the outputs of the feature extractor of the first model 42 as to outputs of the feature extractor of the second model 52.

The loss function with the regularization term may be written as follows:

$$\text{Loss}_{total} = L_{Distil} + w(L_{DistilVsFirst} + L_{DistilVsSecond}) \quad \text{(Equation 3)}$$

L_Distil is a distillation loss term. The distillation loss term compares outputs of the distil model 60 to the first model 42 and the second model 52. The distillation losses used for regressing third model outputs versus predictions of the first and second model. The distillation loss is applied to soft outputs.

Soft outputs may be probability outputs that are representative of a respective probability for each label that is classified by a model. A hard output may be a final classification which may be obtained by thresholding, normalizing, or otherwise processing a soft output.

The term logits is used to refer to the raw output of a network, before normalization or processing to a suitable range, for example normalization or processing to obtain an output value that is between 0 and 1. Logits may be considered to be a soft output.

Hard outputs may typically computed by applying a softmax, sigmoid, or thresholding function to the logits.

In the present embodiment, the distillation loss combines a difference between logits that are output by the distil model 60 and logits that are output by the first model 42, and a difference between logits that are output by the distil model 60 and logits that are output by the second model 52.

In other embodiments, any suitable distillation loss term may be used.

($L_{DistilVsFirst}$ $L_{DistilVsSecond}$) is a regularization term. $L_{DistilVsFirst}$ compares outputs of a feature extractor of the distil model 60 to outputs of a feature extractor of the first model 42. Outputs are compared by passing input data through the feature extractor of the distil model 60 and through the feature extractor of the first model 42. By comparing outputs of the feature extractors rather than comparing model parameters, the training may be given more flexibility.

The outputs that are compared in the regularization term are not the final outputs of the distil model 60 and first model 42. The outputs that are compared in the regularization term are not the same outputs that are used in calculating the distillation loss. The outputs that are compared in the regularization term are outputs of the feature extractor, which forms a first part of the neural network. The outputs that are compared in the distillation loss are soft outputs of the network, which come from the second part of the neural network, in which features are combined.

Similarly, $L_{DistilVsSecond}$ compares outputs of the feature extractor of the distil model 60 to outputs of a feature extractor of the second model 52.

w is a weighting. In the present embodiment, the same weighting is used to weight $L_{DistilVsFirst}$ and $L_{DistilVsSecond}$ In other embodiments, different weightings may be used for $L_{DistilVsFirst}$ and $L_{DistilVsSecond}$ respectively.

In the present embodiment, the weighting is:

$$w = \frac{\|\varphi_{first} - \varphi_{distil\_model}\| + \|\varphi_{second} - \varphi_{distil\_model}\|}{\|\varphi_{first} - \varphi_{distil\_model\_start}\| + \|\varphi_{second} - \varphi_{distil\_model\_start}\|}$$ (Equation 4)

In Equation 4, θ is used to refer to the subset of model parameters for a feature extractor. $\varphi_{first}$ is a set of model parameter weights for each node in the feature extractor of the first model 42, $\varphi_{second}$ is a set of model parameter weights for each node in the feature extractor of the second model 52, $\varphi_{distil\_model}$ is a current set of model parameter weights for each node in the feature extractor of the distil model 60, and $\varphi_{distil\_model\_start}$ is a starting set of model parameter weights for each node in the feature extractor of the distil model 60. The values for $\varphi_{first}$, $\varphi_{second}$, and $\varphi_{distil\_model}$ change during training as the models are updated. $\varphi_{distil\_model\_start}$ is a static term. The differences are computed in the same way as for the model differences described above, for example by using an L1 distance.

In this embodiment, the weighting used is a decaying weighting. As the difference between the parameters of the distil model 60 and the first and second models 42, 52 decrease, the regularization term in the loss becomes less strongly weighted.

In other embodiments, any suitable weighting may be used. In some embodiments, weighting of the regularization term is learned. In further embodiments, a weighting of the regularization term is set manually by a user.

If the determined measure of difference did not exceed the threshold at stage 74, no regularization term is used and the loss is simply a distillation loss, $L_{Distil}$.

At stage 78, the model training circuitry 36 trains the distil model 60 using the loss that is determined at stage 76. Any suitable model training method may be used, for example training using stochastic gradient descent. The use of the regularization term in addition to the distillation loss in the training of the distil model may cause the distil model 60 to better balance its similarity to the first model 42 versus its similarity to the second model 52, despite only having access to the second set of training data 50. The use of the regularization term may reduce bias towards the second model 52 and/or second set of training data 50.

The trained distil model 60 provides a single model that performs the tasks of both the first model and the second model. It is not necessary to have all of the training data for training the first task available at the same time as the data for training the second task.

Instead, the second model and distil model 60 may be trained using the second set of training data without access to the first set of training data.

At stage 79, the inference circuitry 38 applies the trained distil model 60 to new image data, to perform one or both of the first task and the second task. For example, an input to the trained distil model 60 may comprise image data obtained from a scan of a patient. The trained distil model 60 may process the image data to obtain a first output relating to the first task and/or a second output relating to the second task. For example, the first task may be a segmentation of a first anatomical feature in the image data, and the second task may be a segmentation of a second, different anatomical feature in the image data.

Figure 6:
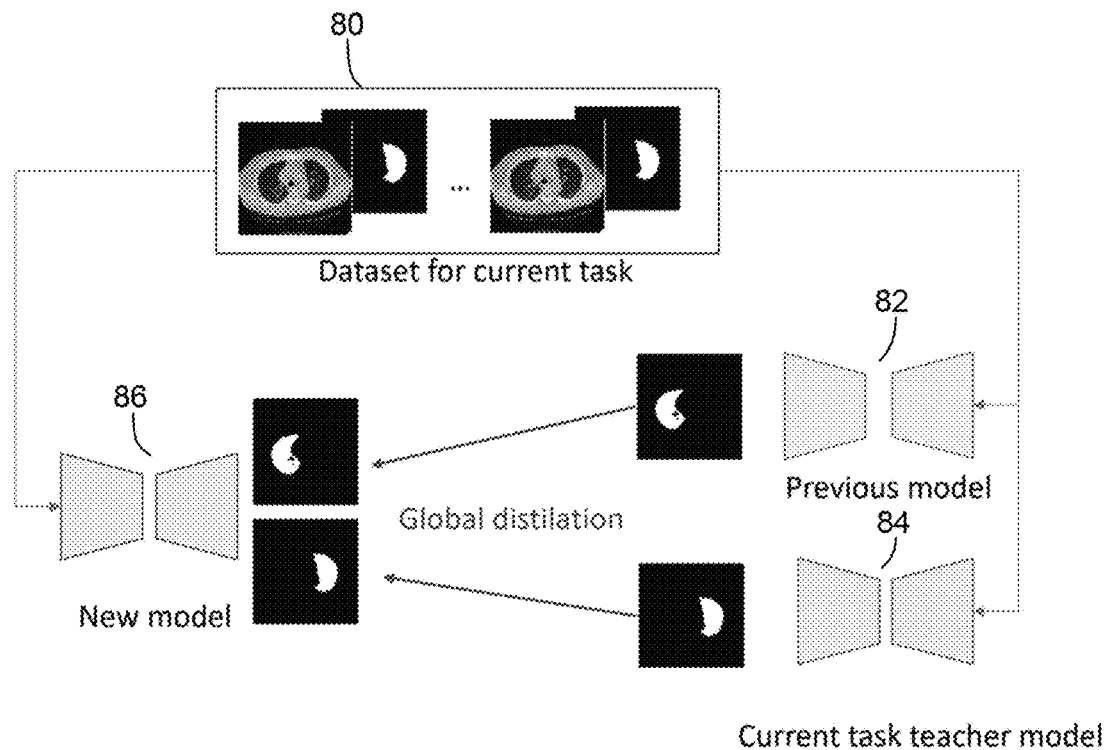
FIG. 6 is a schematic illustration of a method of incremental class learning in accordance with an embodiment.

FIG. 6 shows a method of incremental class learning in accordance with an embodiment. In the embodiment of FIG. 6, a set of training data 80 is available to the model training circuitry 36. The set of training data 80 is annotated with ground truth labels related to a current task, which in the example of FIG. 6 is the segmentation of a right lung.

The model training circuitry 36 inputs the training data 80 to a previous model 82. The previous model 82 has previously been trained to perform at least one different task. In the embodiment of FIG. 6, the at least one different task comprises segmentation of a left lung.

The model training circuitry 36 does not have access to training data on which the previous model 82 was trained.

The model training circuitry 36 also inputs the training data 80 to a current model 84, which may be described as a current task teacher model. The current model 84 has been trained to perform the current task of segmenting a right lung.

The model training circuitry 36 performs a global distillation process to obtain a new model 86, which is a distillation model. To perform the global distillation, the model training circuitry 36 inputs the training data 80 to an initial distil model. The model training circuitry 38 adjusts the initial distil model using a loss function corresponding to that of Equation 3.

$$\text{Loss}_{total} = L_{Distil} + w(L_{DistilVsPast} + L_{DistilVsCurrent})$$ (Equation 5)

$$w = \frac{\|\theta_{past} - \theta_{distil\_model}\| + \|\theta_{current} - \theta_{distil\_model}\|}{\|\theta_{past} - \theta_{distil\_model\_start}\| + \|\theta_{current} - \theta_{distil\_model\_start}\|}$$ (Equation 6)

$L_{Distil}$ is the distillation loss, which compares the outputs of the distil model 86 to the previous model 82 and current model 84. $L_{DistilVsPast}$ compares a outputs of the feature extractor of the distil model 86 to the outputs of the feature extractor of the previous model 82. $L_{DistilVsCurrent}$ compares outputs of the feature extractor of the distil model 86 to the outputs of the feature extractor of the current model 84.

In other embodiments, the previous model may be trained on any suitable number of past tasks. The process described above with reference to FIG. 6 may be repeated. When a new task is added, the distil model 86 becomes a previous model. A new current model is trained on a new set of current data to perform the new task. The new current model may be trained from scratch or using the previous model or any other suitable model as a starting point. The distil model 86 and new current model are then used as input to train a further distil model. The training of new models may be repeated for any appropriate number of tasks and any suitable number of sets of training data.

In one example, a model was trained on a first set of training data for oesophagus segmentation. The model was trained separately on a second set of training data for segmentation of consolidation, without access to the first data set or to the oesophagus segmentations.

It was found that a distil model without regularization saw a drop in the task performance even when only two tasks were included in the distil model. An introduction of regularization helped to preserve performance on the oesophagus segmentation task.

If both the first set of training data and second set of training data were available to the model at the same time, a multitask model could be trained for both tasks. This may be considered to be an ideal scenario. However, in practice, data may often be available sequentially and access may be limited. A use of regularization may allow improved performance of a model trained using global distillation.

Figure 7:
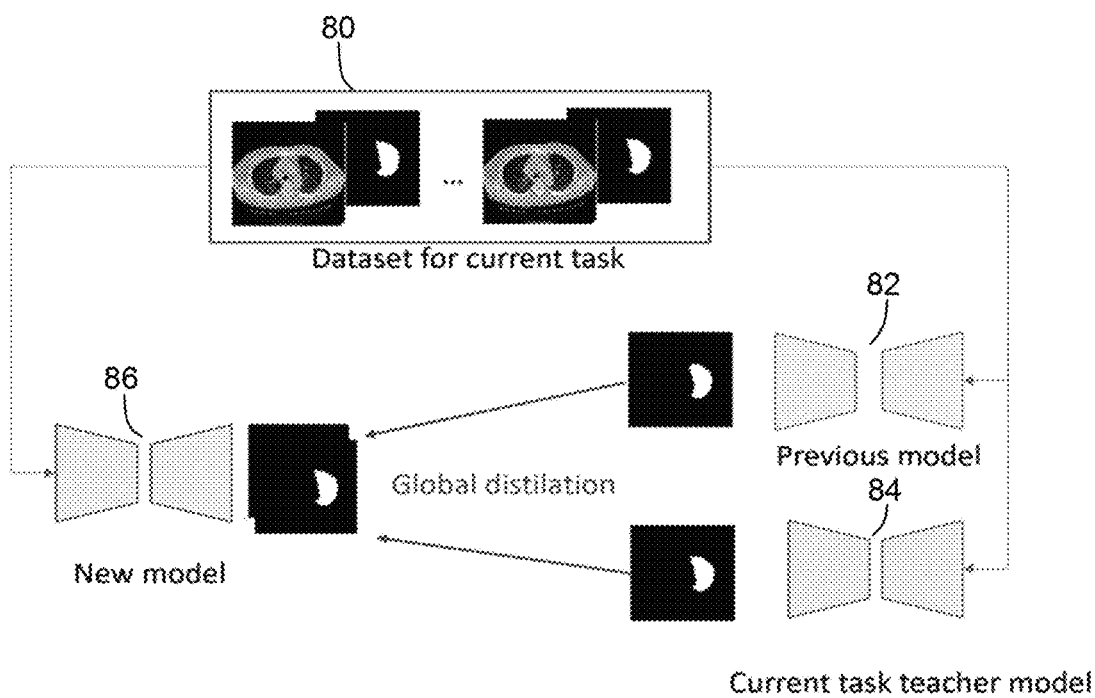
FIG. 7 is a schematic illustration of a method of incremental domain learning in accordance with an embodiment.

FIG. 7 shows a method of incremental domain learning in accordance with an embodiment. In the embodiment of FIG. 7, a set of training data 90 is available to the model training circuitry 36. The set of training data 90 is annotated with ground truth labels related to a task, which in the example of FIG. 7 is the segmentation of a right lung.

The model training circuitry 36 inputs the training data 90 to a previous model 92. The previous model 92 has previously been trained to perform the task on a previous domain.

The model training circuitry 36 does not have access to training data on which the previous model 92 was trained.

The model training circuitry 36 also inputs the training data 90 to a current model 94, which may be described as a current task teacher model. The current model 84 has been trained to perform the task on a current domain which is different from the previous domain.

The model training circuitry 36 performs a global distillation process to obtain a new model 96, which is a distillation model. To perform the global distillation, the model training circuitry 36 inputs the training data 90 to an initial distil model. The model training circuitry 36 adjusts the initial distil model using the loss function of Equation 5.

In the embodiment of FIG. 6, the weighting w may be calculated in a different way from that shown in Equation 6. For example, the calculation of w may use a different distance metric. The distance metric may be chosen to measure difference between domains, for example using a distribution of data values across the whole image instead of in task-specific areas.

In the embodiment of FIG. 6, two separate output channels are retained in the distil model 96, one per domain. The use of two separate output channels may facilitate domain specific weights learning. At prediction time, the inference circuitry 38 takes a maximum of the outputs of the two channels to obtain segmentation. The inference circuitry 38 takes a variance between outputs to obtain an uncertainty map.

In one example, a model was trained to perform spinal cord segmentation. The model was trained on a first set of training data. The model was trained separately on a second set of training data having a different domain. There was therefore a domain shift in which the model was trained on the same task but with different input distributions. Two separate outputs were obtained, one per domain. At prediction time, a maximum of outputs was taken to obtain segmentation. A variance between outputs was taken to obtain uncertainty maps. Keeping multiple outputs may make it easier to generate an uncertainty map.

Figure 8:
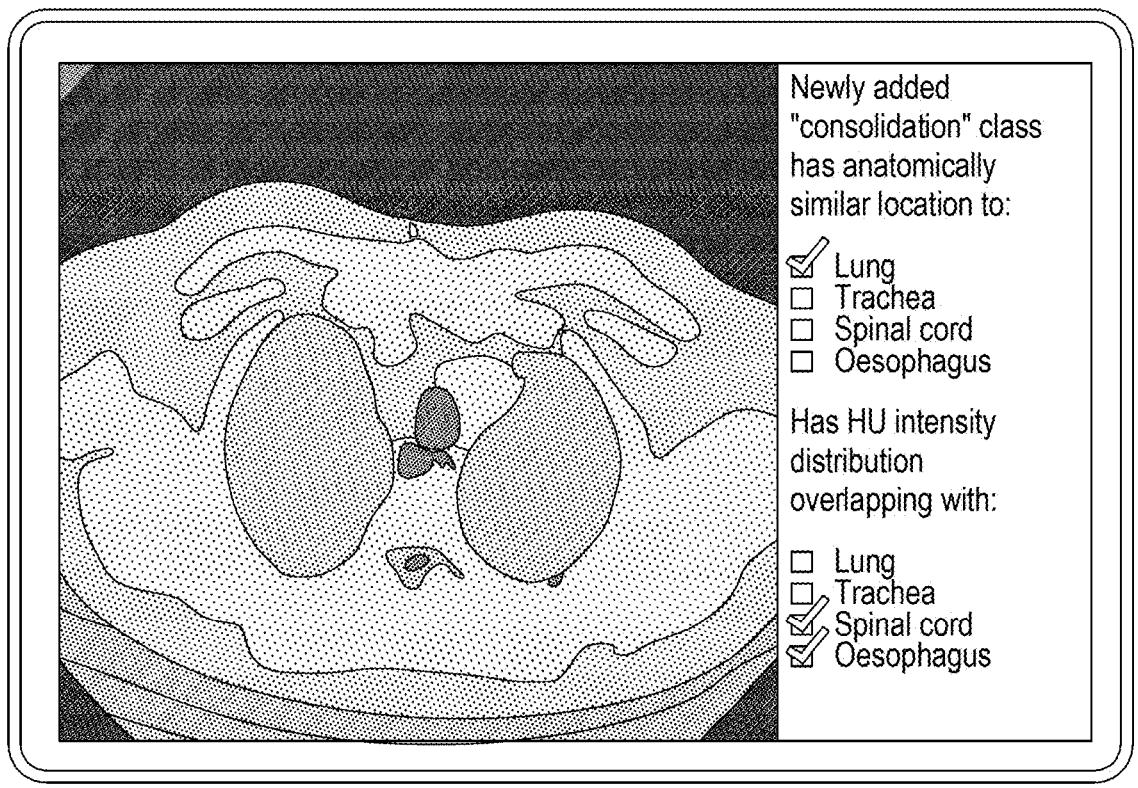
FIG. 8 is an illustration of a user interface in accordance with an embodiment.

FIG. 8 is an example of a user interface which a user may use to manually input difference information. The user is given an opportunity to add information about a new task by providing user input. The user interface circuitry 38 processes the user input to obtain difference information. The difference information is used to determine whether to include a regularization term in training a distil model to perform the new task in addition to one or more existing tasks.

In the example of FIG. 8, the user interface circuitry 38 displays a slice image 100 to the user on display screen 26. The user interface circuitry 38 also displays a first set of check boxes 110, 111, 112, 113 and a second set of check boxes 120, 121, 122, 123.

The first set of check boxes 110, 111, 112, 113 is displayed below and associated with a text 'Newly added "consolidation" class has anatomically similar location to:' Check box 110 is displayed beside the text 'Lung'. In the example shown, the user has provided a user input by checking the check box 110 to indicate that the user considers the new class, consolidation, to have an anatomically similar location to Lung.

Check box 111 is displayed beside the text 'Trachea'. Check box 112 is displayed beside the text 'Spinal cord'. Check box 113 is displayed beside the text 'Oesophagus'. In the example shown in FIG. 7, the user has not ticked any of check boxes 111, 112 or 113.

The user interface circuitry 39 processes the user input to determine that the user considers the new class, consolidation, to have an anatomically similar location to Lung, and to determine that the user does not consider the new class, consolidation, to have an anatomically similar location to Trachea, Spinal cord or Oesophagus.

The second set of check boxes 120, 121, 122, 123 is displayed below and associated with a text 'Has HU intensity distribution overlapping with:'

Check box 120 is displayed beside the text 'Lung'. Check box 121 is displayed beside the text 'Trachea'. In the example shown in FIG. 7, the user has not ticked check box 120 or check box 121.

Check box 122 is displayed beside the text 'Spinal cord'. Check box 123 is displayed beside the text 'Oesophagus'. In the example shown, the user has provided user input by checking the check boxes 122 and 123 to indicate that the user considers the new class, consolidation, to have a similar intensity distribution to Spinal cord and Oesophagus.

The user interface circuitry 39 processes the user input to determine that the user considers the new class, consolidation, to have a similar intensity distribution to Spinal Cord and Oesophagus, and to determine that the user considers that the new class, consolidation, does not have a similar intensity distribution to Lung or Trachea.

The difference circuitry 34 uses the determinations performed by the user interface circuitry 39 based on the user inputs in check boxes 110, 111, 112, 113 to determine a measure of difference between the task of segmenting consolidation and one or more of the tasks of segmenting lung, segmenting trachea, segmenting spinal cord, and segmenting oesophagus. The difference circuitry 34 uses the determinations performed by the user interface circuitry 39 based on the user inputs in check boxes 120, 121, 122, 123 to determine a measure of difference between the intensities consolidation and one or more of the intensities of lung, trachea, spinal cord, and oesophagus.

The difference circuitry 34 determines whether or not to use a regularization term in a loss function for training a distil model 60 based on the determined measure or measures of difference. The measure or measures of difference are based on the user's input. In other embodiments, any suitable user input may be used to determine one or more measures of difference between tasks thereby to determine one or more measures of difference between models trained to perform those tasks. Any suitable user input may be used to determine one or more measures of difference between domains and thereby to determine one or more measures of difference between models trained to operate on those domains.

Model training methods as described above may be used to extend capabilities of an existing model. In one embodiment, a user of scanner technology such as an institution adds a new type of data. For example, the user may have replaced their old scanner with a new one. With a continual learning set up as described above, the user may make use of a trained model on data gathered with both the new scanner and the trained model. Training the model to perform on both data from the old scanner on data from the new scanner may only require the addition of a relatively small number of annotations for the new data.

Model training method as described above may be used in federated learning. In a conventional federated learning algorithm, a model (for example, a neural network) is trained on more than one cohort simultaneously without data transferring between the cohorts. The collection of institutions providing data is called a federation. A copy of the model is sent from a central location server to each institution in the federation. The copy of the model that has been sent to each institution is trained on the data cohort at that institution for some period of time. After the period of time, each institution returns trained model parameters to the central location server.

A continual learning method as described above may be used to update model weights in house at any of the institutions of the federation.

Figure 9A:
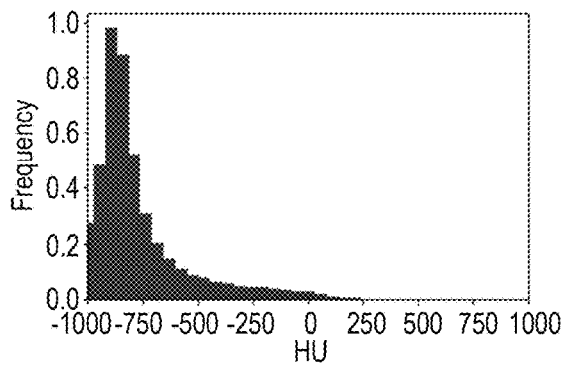
FIG. 9a shows an intensity frequency histogram for the left lung.
Figure 9B:
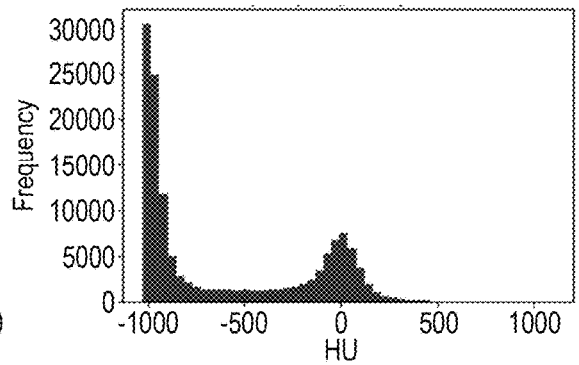
FIG. 9b shows an intensity frequency histogram for the trachea.
Figure 9C:
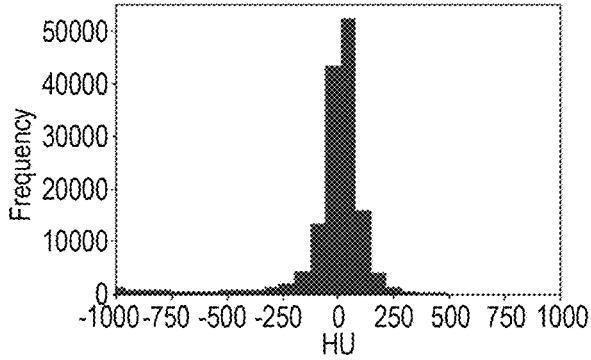
FIG. 9c shows an intensity frequency histogram for the oesophagus.
Figure 9D:
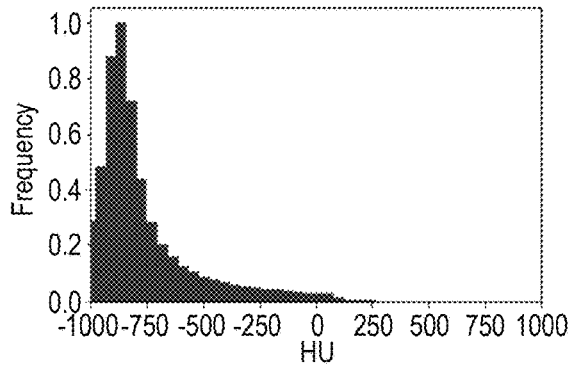
FIG. 9d shows an intensity frequency histogram for the right lung.
Figure 9E:
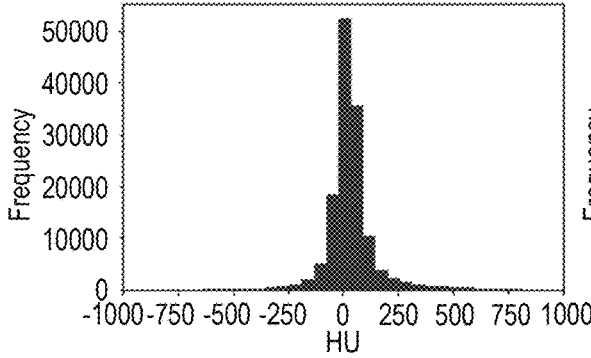
FIG. 9e shows an intensity frequency histogram for the spinal cord.
Figure 9F:
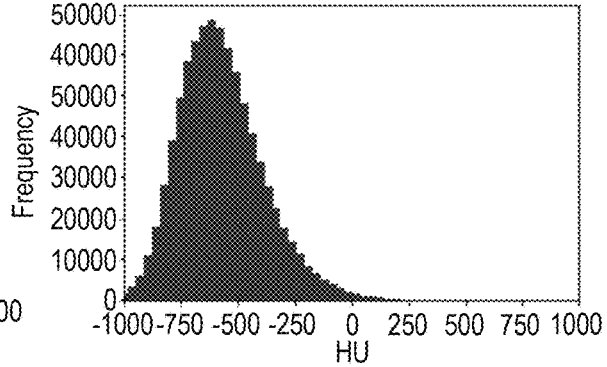
FIG. 9f shows an intensity frequency histogram for ground glass.
Figure 9G:
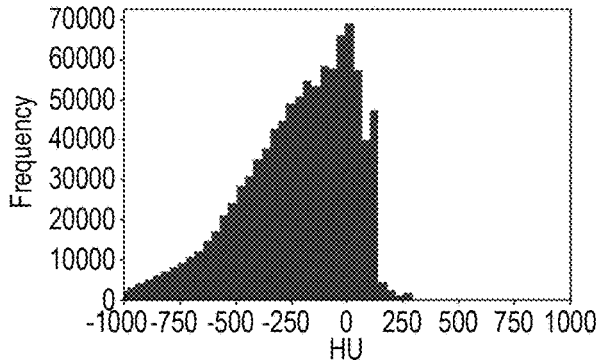
FIG. 9g shows an intensity frequency histogram for consolidation.

FIGS. 9a to 9g show a set of intensity distributions from which a difference between models may be inferred. The intensity distributions of FIGS. 9a to 9b are intensity distributions for various anatomy and pathology classes in chest CT. Each of the intensity distributions is represented by a respective histogram in which frequency is plotted against intensity in Hounsfield units. FIG. 9a shows an intensity frequency histogram for the left lung. FIG. 9b shows an intensity frequency histogram for the trachea. FIG. 9c shows an intensity frequency histogram for the oesophagus. FIG. 9d shows an intensity frequency histogram for the right lung. FIG. 9e shows an intensity frequency histogram for the spinal cord. FIG. 9f shows an intensity frequency histogram for ground glass. FIG. 9g shows an intensity frequency histogram for consolidation.

It may be seen that each of the various anatomies or pathologies in FIGS. 9a to 9g has a distinctly different intensity distribution. An intensity distribution for consolidation may be compared to intensity distributions for the other anatomies or pathologies. It may be seen that oesophagus has the highest HU intensity overlap with consolidation.

It may be possible to infer how similar a pair of tasks are based on an overlap between the intensities relating to the tasks. For example, oesophagus and consolidation are quite similar. In some circumstances, learning different tasks on a similar range of intensity values may be difficult.

Figure 10:
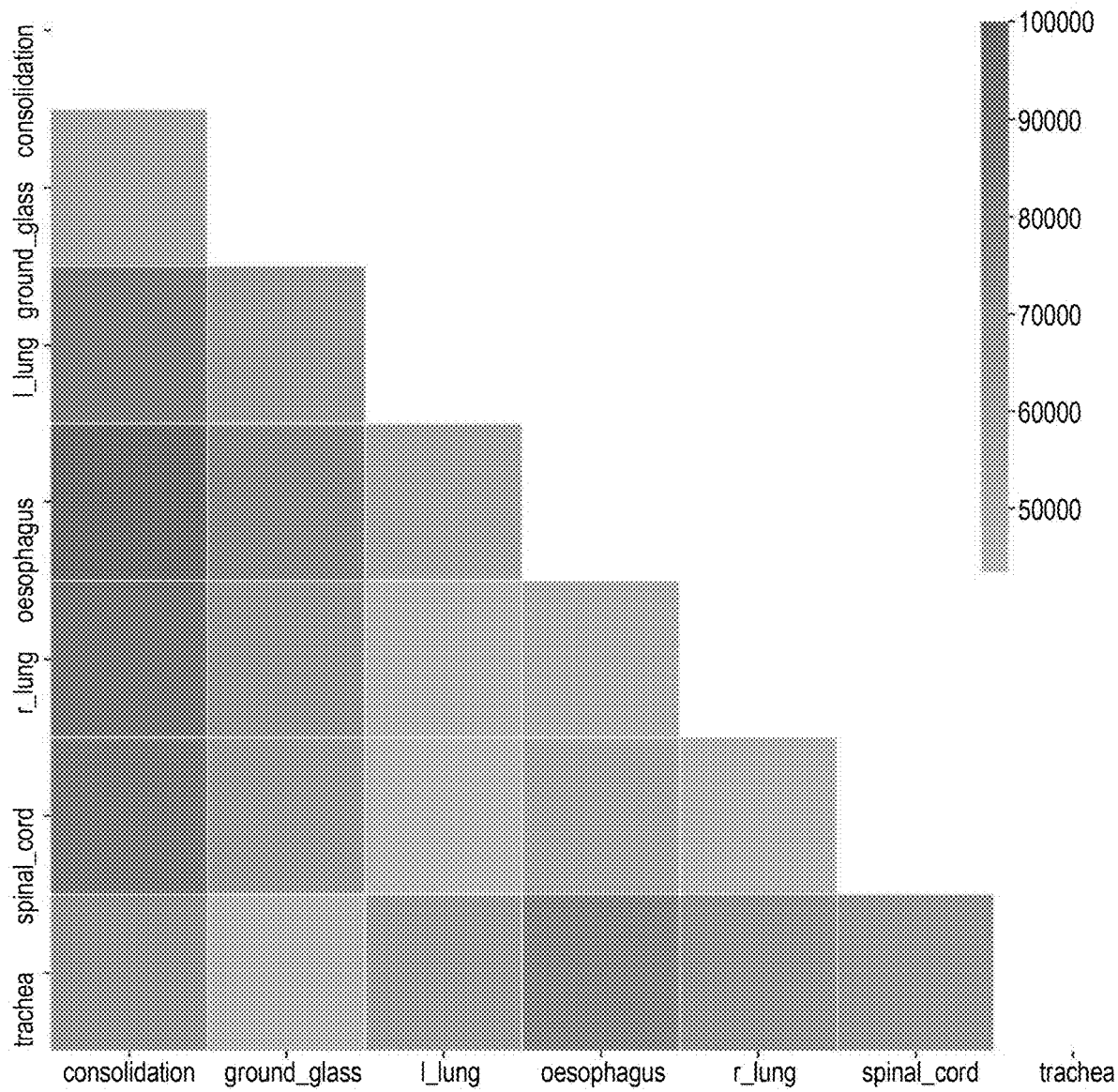
FIG. 10 is a plot representing a distance between model weights for a model trained on various classes in chest CT.

FIG. 10 is a plot representing a distance between model weights for a SqueezUnet trained on various classes in chest CT. The classes are consolidation, ground glass, left lung, oesophagus, right lung, spinal cord and trachea. A larger distance between model weights is shown as a darker color in FIG. 10. Consolidation and oesophagus have the largest model weights distance. There is therefore a large distance between a model trained on consolidation and a model trained on oesophagus.

Given that consolidation and oesophagus have the highest HU intensity overlap and the largest model weights distance, it may be inferred that for learning these classes sequentially a regularization may be required.

In some embodiments, information about a similarity between tasks is used to select an order in which the model is to be trained on new tasks. In some embodiments, the network is trained on tasks and/or domains that are most different in their model parameters first. By training on the most different tasks or domains first, the model may be encourages to acquire a broad range of learned features at an early stage. The broad range of learned features may then be used to adapt to new tasks and/or domains later.

In embodiments described above, a new distil model is initialized instead of attempting to adapt a past model. Training is performed on logits from past and current tasks, with no true hard labels required after the previous and current models have been trained. A regularization term is introduced that helps to balance between past and current task performance. Methods are adapted for incremental domain learning as well as incremental domain learning.

A difference between weights of a new distil model and previous and current models is calculated and applied as a weighting for regularization based on global distillation losses. There is no requirement for data from previous tasks to be used in training of the distil model or in the regularization.

Embodiments above are described with reference to medical image data. In other embodiments, model training methods as described above may be used to train any suitable models. The data on which the models are trained may not be image data. The data on which the models are trained may not be medical data.

In certain embodiments, there is provided a method for incremental addition of knowledge to a healthcare decision support system, comprising: N machine learning models, for N tasks/domains; data available sequentially for the tasks/ domain; and a training process that encapsulates similarity/ differences between the tasks.

The distance/similarity between the tasks/domains may be explicitly incorporated in the model training loss function.

The distance/similarity between the tasks/domains may be provided by the user.

The similarity between the domains or the difficulty of discrimination between tasks may be determined by the overlap of task intensities.

The distance/similarity between the tasks/domains may be computed as a difference between the models.

The distance/similarity between the tasks/domains may be predicted by an external model.

The distance/similarity between the tasks/domains may be used to determine the best task/domain on which to train the model.

In certain embodiments, there is provided an apparatus comprising processing circuitry configured to: receive a first model and a second model, wherein the first model performs a first task and/or trained on first training data of a first domain, wherein the second model performs a second task which is different from the first task and/or trained on second training data which is different from the first training data and relating to second domain which is different from the first domain, generate a third model based on difference information relating to the first and second model, wherein the third model performs both of the first task and the second task and/or corresponds to both of the first domain and the second domain.

The difference information may be determined based on feature extractors of the first model and the second model.

In certain embodiments, there is provided a method of training models, wherein the models comprise: a first model for performing a first task and/or trained on training data of a first domain; a second model for performing a second task and/or trained on training data of a second domain, and the method comprises: determining difference between the first task and the second task and/or between the first domain and the second domain and using said difference in training at least one of the first and second model.

Said difference may be included in a model loss training function used in the training.

Using said difference in training may comprise using said difference in a regularization scheme that discourages bias in the training towards either first or second task and/or towards the first domain or second domain.

The training may comprise training the second model, wherein the training includes using predictions from the first trained model and said determined difference.

The method may further comprise producing a distillation model based on the training and the first and second models, which incorporates information from both training data of the first and/or second domains, and/or information relating to the first and second tasks.

The first task may comprise segmentation of a first anatomical feature or pathology and the second task may comprise segmentation of a second, different anatomical feature or pathology.

The first domain and the second domain may relate to different locations, and/or different scanners, and/or different imaging modalities.

The difference may be determined at least partly based on input from a user.

The difference may be determined based on overlap of task intensities.

The difference may be computed as a difference between the models.

The difference may be determined based on a prediction by a further model.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments have been described, these embodiments have been presented by way of example only, and are not intended to limit the scope of the invention. Indeed the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. An apparatus comprising processing circuitry configured to:
    receive a first model and a second model, wherein:
        the first model is trained to perform a first task;
        the first model is trained on first training data of a first domain;
        the second model is trained on second, different training data; and at least one of a) and b):—
        a) the second model is trained to perform a second task that is different from the first task;
        b) the second training data is data of a second domain that is different from the first domain;
    determine difference information that is representative of a difference between the first model and the second model and/or between the first task and the second task and/or between the first domain and the second domain; and
    generate a third model using the first model, the second model and the difference information, wherein the generating of the third model comprises training the third model to perform both of the first task and the second task and/or to operate on both the first domain and the second domain.

2. An apparatus according to claim 1, wherein the third model is a distil model.

3. An apparatus according to claim 1, wherein the training of the third model comprises using a loss function that comprises or is derived from the determined difference information.

4. An apparatus according to claim 3, wherein the loss function comprises a regularization term that is configured to balance a difference between the first model and the third model with a difference between the second model and the third model, so as to discourage bias in the training towards either the first task or the second task and/or towards either the first domain or the second domain.

5. An apparatus according to claim 4, wherein the regularization term comprises a weighting based on model parameters of the first model, second model and third model.

6. An apparatus according to claim 5, wherein the weighting is a decaying weighting.

7. An apparatus according to claim 3, wherein the loss function further comprises a distillation loss term that comprises a difference between outputs of the first model and outputs of the third model, and a difference between outputs of the second model and outputs of the third model.

8. An apparatus according to claim 1, wherein the training of the third model is performed using the second training data.

9. An apparatus according to claim 1, wherein the training of the third model is performed without access to the first training data.

10. An apparatus according to claim 1, wherein the second model is trained to perform the second task that is different from the first task, and wherein the second model is not trained to perform the first task.

11. An apparatus according to claim 1, wherein the determining of the difference information is based at least partly on feature extractors of the first model and the second model.

12. An apparatus according to claim 1, wherein the determining of the difference information is based at least partly on a difference in distribution of task intensities between the first task and the second task and/or between the first domain and the second domain.

13. An apparatus according to claim 1, wherein the determining of the difference information is based at least partly on a learned distance metric.

14. An apparatus according to claim 13, wherein the user input comprises information relating to anatomical similarity or intensity distribution.

15. An apparatus according to claim 1, wherein the determining of the difference information is based at least partly on user input.

16. An apparatus according to claim 1, wherein the determining of the difference information is based at least partly on a prediction by a further trained model.

17. An apparatus according to claim 1, wherein the first training data and the second training data each comprise medical imaging data.

18. An apparatus according to claim 1, wherein the first task comprises segmentation of a first anatomical feature or pathology and the second task comprises segmentation of a second, different anatomical feature or pathology.

19. An apparatus according to claim 1, wherein the first domain and the second domain relate to different locations, and/or different scanners, and/or different imaging modalities.

20. A method comprising:

receiving a first model and a second model, wherein:

the first model is trained to perform a first task;

the first model is trained on first training data of a first domain;

the second model is trained on second, different training data; and at least one of a) and b):— a) the second model is trained to perform a second task that is different from the first task;

b) the second training data is data of a second domain that is different from the first domain;

determining difference information that is representative of a difference between the first model and the second model and/or between the first task and the second task and/or between the first domain and the second domain; and generating a third model using the first model, the second model and the difference information, wherein the generating of the third model comprises training the third model to perform both of the first task and the second task and/or to operate on both the first domain and the second domain.

* * * * *